Oct. 15, 1968  C. BEAU ET AL  3,405,816
VEHICLE GARAGE
Filed July 29, 1965
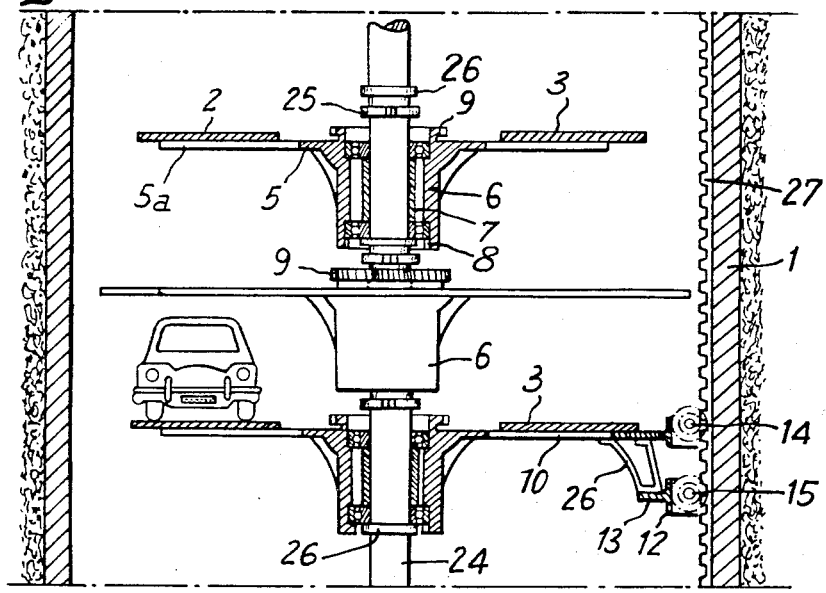
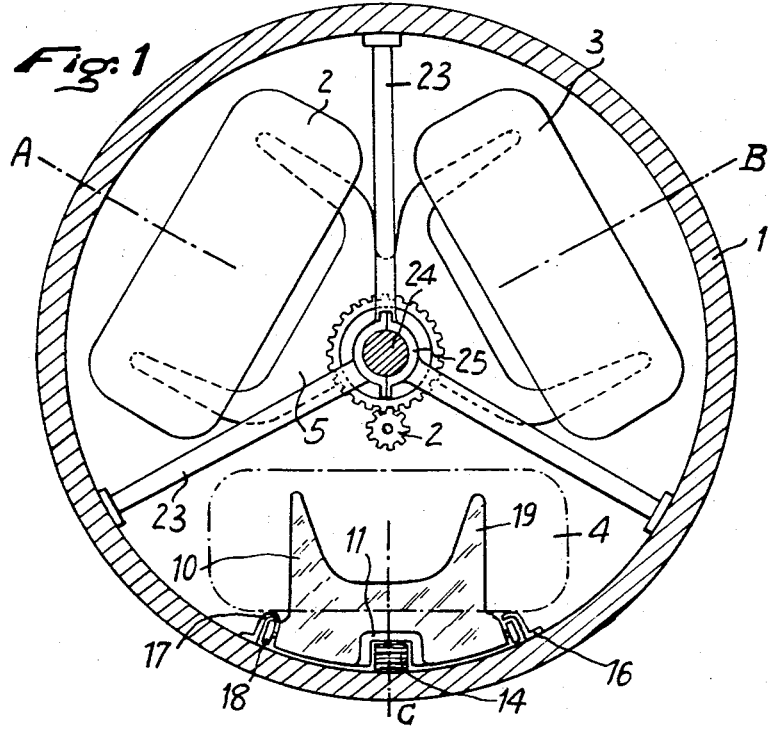
INVENTORS
CHRISTIAN BEAU
GÉRARD BEAU
By Young & Thompson
ATTYS.

United States Patent Office 3,405,816
Patented Oct. 15, 1968

3,405,816
VEHICLE GARAGE
Christian Beau, 31 Ave. de Louvois, Chaville, Hauts-de-Seine, France, and Gérard Beau, 17 Rue de l'Ancienne Comedie, Paris 6eme, France
Filed July 29, 1965, Ser. No. 475,835
Claims priority, application France, July 29, 1964, 983,383
8 Claims. (Cl. 214—16.1)

ABSTRACT OF THE DISCLOSURE

A parking garage comprises a cylindrical casing sunk in the ground and having a coaxial central column about which brackets are individually rotatable at each of a plurality of levels. Each bracket is provided with space for two automobiles, 120° apart, with the third space empty. An upright elevator is secured to a side wall of the casing and moves in that empty space to position automobiles to enter or leave each of the levels.

---

The invention relates to a garage for motor vehicles which is of the vertical type and preferably underground and constructed to provide a unit capable of storing the greatest possible number of vehicles in a given floor space, with the maximum facility of access for parking and removal of the vehicles.

According to the invention set forth in the parent application an enclosing wall, which may be either a shaft or a tower in general of circular section, carries a regularly spaced arrangement of brackets forming supports for movable vehicle-carrying platforms at different levels such that at each level, with the platforms in their parking position, the longitudinal axes of the platforms form two sides of an equilateral or right-angled triangle, the third side of the triangle, at each level, remaining unencumbered in the axis of a vertical cage that permits the passage of a vertical handling, i.e. raising and lowering, device that is capable of moving through the entire height of the shaft. An opening or passageway made in the enclosing wall at any given level permits a vehicle to be loaded on to the free platform which has been brought in front of the aperture by a bracket. The movable platforms are of known type, a space being left between them and their supports so as to permit the introduction of forks that are carried by the handling means. These forks are thus fixed to the vertical handling means. The movable platforms are, of course, channeled to permit the passage, at the vertical handling position, of the said handling means and, in particular, of its forks.

The mode of operation of the garage is as follows:

A bracket bearing an empty movable platform is brought in front of the loading and unloading aperture of the enclosing wall of the garage. The vehicle to be parked is then pushed on to that platform. Next, the vertical handling means takes the platform, together with the vehicle loaded on it, on to its forks and hoists it to a position slightly above the selected parking level. An empty bracket is then brought to the "berth" located in the path of travel of the vertical handling means, whereupon the latter deposits the movable platform and the loaded vehicle on to that bracket.

Finally, the bracket is returned laterally to a parking or storing position, thereby freeing the vertical travel cage of the vertical handling means, which again becomes available for another vehicle handling operation. The reverse procedure is followed in order to remove a vehicle from the garage.

The object of the present invention is to provide a combination of means for rotating the brackets at each parking level which are supported at each level by a vertical column on which they may be displaced angularly and vertical handling means carried by the enclosing wall of the garage.

The brackets carrying the platforms mounted at each level on the central column may be separated and individually controlled. Preferably they may be integral with a table comprising a cylindrical sleeve at each level, mounted and centered on the axial column, which sleeve may be pivoted by balls, rolls, rollers and the like on a seat or bearing surface of said column and the movement of said table is effected by a toothed gear wheel cooperating with a driving pinion carried by the central column on the wall of the garage.

The raising and lowering device comprises a supporting surface in the form of forks or plates suitably sustained and connected with means for guiding and operating. Said operating means may be of any type such as hydraulic, screw, smooth rails with adhering wheels, electromagnetic rail with linear motor, rack bars, endless chains, suspended chains, chains with lugs, windless and cable or any other means providing a rapid linear displacement and stopping at each level.

Other characteristics or objects will appear from the following description taken with the annexed drawings which give a nonlimiting example of the invention.

In the drawings:

FIGURE 1 is a transverse cross-sectional view of a shaft forming a subterranean garage, FIGURE 2 is a longitudinal sectional view of the shaft of FIGURE 1 on which three different parking levels are represented; the upper level being taken on line A–B of FIGURE 1; the intermediate level showing a nonsectional view of the parking platforms and their supports and the lower level being taken on line A–C of FIGURE 1.

The shaft 1, which is preferably circular in section, can be sunk to the desired depth depending on the number of vehicles to be parked or it may be built entirely or partially above the ground. The wall can be concreted or it can also be formed by a metal shaft lining composed of juxtaposed and assembled components.

The diameter of the shaft may be constant throughout its height. If the shaft is telescoped during its sinking the diameter is largest at its upper part and a metallic structure is built for compensating the difference of the two diameters.

Two vehicle-carrying and parking platforms 2 and 3 are disposed at each level at an angle to each other so as to in effect form two sides of an equilateral triangle the third side of which remains free in order to provide a space to permit the passage of the raising and lowering device. Each vehicle-carrying platform is supported on the arms 5a of a fork extending from the bracket 5 or table pivotally mounted on the central column 24. Each plate or bracket 5 is provided with a cylindrical sleeve 6 mounted by the intermediary of two bearings 8 stayed or held in position by ring 7 and supported on an annular supporting surface or seat 26 of the column. It is therefore this column and particularly the supporting surfaces 26 that establish the parking levels in the shaft. At the upper part of each table is mounted a toothed gear 9 driven by a pinion 20 fixed with a shaft of a driving motor provided with means (not shown) for reversing its direction of movement and carried by the central column. In this manner the bracket and table supported thereby may effect in one direction or the opposite a rotation of 120° bringing each platform 2 or 3 from the parking position to the position represented by reference numeral 4 and shown in dot-dash lines for receiving a vehicle from the handling device. The driving motor at each level may be fixed to the central column; it can be fixed to the wall of the shaft and in this case the driving of the toothed gear will be assured by a chain or any other means. In an advantageous manner the central column 24 may be positioned by wall braces or stays 23 of which one extremity is connected to a collar 25 surrounding the column 24 and the other is anchored in the wall of the shaft.

The raising and lowering device comprises a supporting surface 10 having two fork-forming arms 19 or pallettes for receiving a platform such as 4, the exterior profile of which is in the form of a circular segment concentric with the wall of the shaft. This surface 10 is itself connected by a suitable bracing to a horizontal bar 13 in the form of a circular segment positioned under said surface 10 and being supported on the wall of the shaft by a roller or a pinion. For this purpose there may be provided on the surface 10 a bearing-forming boss 11 for supporting a roller or a pinion 14 and on the bar 13, a bearing-forming boss 12 for supporting a pinion 15. These pinions 14 and 15 may be driven and engaged with a vertical rack 27 mounted throughout the height of the shaft. In a suitable manner on each side of the supporting surface 10 there may be mounted rollers 18 rolling on two vertical bars or rails 16 and 17 serving as guides and anchored in the wall. These rollers also may be driven and provided to have adherence to the rails or bars. The method of driving may be effected in any suitable manner as has been previously indicated. Thus the load resting on the platform exerts a horizontal reaction which is absorbed by the rack or the vertical rail and all lateral displacement of balancing is eliminated partly by the two guide rails and partly by the supporting surface.

In use, for lowering a vehicle to its parking place it is necessary first of all to pivot the bracket so as to bring the supporting forks in register with the free passage, then to lower the platform carrying the vehicle to the level in question. For raising or removing a vehicle from its parked position, the raising and lowering device is first lowered empty below the level of the bracket carrying the car to be removed. The bracket supporting the car in question is then brought by rotation about the central column into the handling passage and the table 10 of the raising and lowering device is then elevated to engage the platform carrying the vehicle and to raise it up the shaft. It is evident that all of the displacements are synchronized and are obtained by a simple control mechanism.

Naturally, it should be understood that modifications of the structure may be effected without departing from the scope of the invention. In particular, more than three positions of the movable platforms may be provided at each level.

Having described our invention we claim:

1. A garage comprising a vertical casing, a vertical column centered in the casing, a plurality of brackets disposed at different levels along the column, sleeves rotatable on the column and supporting the brackets, means for individually rotating each sleeve and bracket about the axis of the column, a plurality of vehicle-supporting arms on each bracket, means for supporting the vehicle on the arms of each bracket and an elevator secured to a side wall of the casing movable vertically past the bracket arms in interfingering relationship therewith for depositing vehicles on and removing vehicles from the arms of a said bracket.

2. A garage as claimed in claim 1, said casing being cylindrical.

3. A garage as claimed in claim 1, said casing being underground.

4. A garage as claimed in claim 1, and a ring gear in unitary assembly with the bracket, and means in mesh with the ring gear for rotating the bracket about the axis of the column.

5. A garage as claimed in claim 4, said last-named means comprising a pinion gear.

6. A garage as claimed in claim 1, there being two sets of supporting arms on each bracket at an interval of 120° of arc.

7. A garage as claimed in claim 1, said casing being cylindrical and being underground, there being two sets of said arms at an interval of 120° of arc, said means for rotating said brackets comprising a ring gear surrounding the column and integral with each said bracket, and means in mesh with said ring gear for rotating the ring gear.

8. A garage as claimed in claim 7, said last-named means comprising a pinion gear.

References Cited

UNITED STATES PATENTS

| 1,582,099 | 4/1926 | Trask | 214—16.1 |
| 2,771,200 | 11/1956 | Gillard | 214—16.1 |
| 2,849,127 | 8/1958 | Densmore | 214—16.1 |
| 3,054,518 | 9/1962 | Coursey | 214—16.1 |
| 3,204,785 | 9/1965 | Bapulaz | 214—16.1 |

FOREIGN PATENTS

| 1,374,238 | 8/1964 | France. |
| 160,696 | 6/1933 | Switzerland |

HUGH O. SCHULZ, *Primary Examiner*

R. B. JOHNSON, *Assistant Examiner.*